United States Patent Office 3,030,324
Patented Apr. 17, 1962

3,030,324
AMINE MODIFIED LOW MOLECULAR WEIGHT UREA FORMALDEHYDE CONDENSATION PRODUCT AND PROCESS OF PREPARING SAME
Raymond G. Booty, Granville, Ohio, assignor to American Marietta Company, Chicago, Ill., a corporation of Illinois
No Drawing. Filed Jan. 2, 1958, Ser. No. 706,561
18 Claims. (Cl. 260—29.4)

The present invention relates to novel, water-soluble, heat-reactive, low molecular weight condensation products of urea and formaldehyde and to clear aqueous solutions containing the said condensation products dissolved therein to provide water solutions which resist precipitation and turbidity over prolonged periods of storage. The invention also provides urea-formaldehyde condensation products having improved resistance to thermal discoloration and to release of formaldehyde during curing at elevated temperature. The invention includes the production of intermediate products adapted to provide the said condensation products upon reaction with additional formaldehyde, the final condensation product itself and the production of the said clear stable aqueous solutions. The invention also includes higher molecular weight condensation products formed by coupling the said final condensation product.

The invention is based on the discovery, that when a limited proportion of formaldehyde is initially reacted with urea, that dimerization of monomethylol and dimethylol ureas to produce insoluble components must be inhibited despite the fact that these insoluble components further react to produce soluble components. Otherwise, water-soluble, stable, low molecular weight condensates of urea and formaldehyde are not produced. It has further been found that the dimerization of monomethylol and dimethylol ureas can be effectively inhibited by coupling the urea alcohols, e.g., monomethylol urea and dimethylol urea, with a water-soluble nitrogen-containing material selected from the group consisting of ammonia and polyfunctional aliphatic amines, especially primary amines. The coupling must be effected before dimerization has had time to proceed to any substantial extent.

The water-soluble, heat-reactive, low molecular weight urea-formaldehyde condensation products of the invention and the water solutions of enhanced stability which contain the same possess diverse utility. Thus, the condensation products and the water solutions containing the same may be employed to improve the "finish" of textiles, for the bonding of fibrous materials such as glass, rockwool (mineral), paper, for the cementing of wood particles in the production of boards, panels or batts, as an additive to starch and other water-soluble natural or synthetic gums to improve the ultimate resistance to water and moisture of these materials, and as components in surface coatings as well as in many other applications.

In accordance with the present invention, formaldehyde is reacted with urea in a mol ratio of from about 1.5 to 1.1 mols of formaldehyde per mol of urea. The reaction is normally conducted at a temperature in the range of from about 25° C. to about 50° C. in the presence of water and at a pH of from about 6 to 8, preferably from pH 6.7 to 7.7. The desired pH of reaction is conveniently provided by addition of a secondary amine or tertiary amine, although any alkaline material such as caustic soda may be employed. As a result of this reaction, there is produced a clear solution containing monomethylol urea, generally in the presence of a minor proportion of dimethylol urea and in the substantial absence of methylol urea dimers.

The initial urea-formaldehyde condensation reaction is continued until at least about 65% and preferably at least about 85% of the urea has been reacted. If the reaction is permitted to continue for an excessive period of time, monomethylol urea dimer and dimethylol urea dimer form as evidenced by the appearance of turbidity or the formation of a precipitate.

After consumption of at least about 65% urea and prior to substantial dimer formation, it is essential that there be incorporated in the reaction mixture a proportion of ammonia or polyfunctional aliphatic amine corresponding to from 0.33 to 0.66 mol of ammonia per mol of urea initially present and reaction with the ammonia or polyfunctional amine is effected at a temperature in excess of about 60° C. to produce in clear water solution an intermediate condensation product which is substantially free of dissolved complexes with methylol or dimethylol urea dimers.

The clear water solution so produced constitutes a new article of commerce which can be distributed in this form for later reaction when needed with a desired further proportion of formaldehyde in a manner to be later described. In this way, water-soluble condensation products may be produced as desired with any specific ultimate ratio of formaldehyde to urea in the final product desired by the purchaser of the intermediate condensation product.

In the second stage urea-formaldehyde reaction, there is added to the intermediate condensation product from 0.7 to 1.2 mols of formaldehyde per mol of urea and reaction with the additional formaldehyde is effected at a temperature in excess of about 60° C. to produce a water-soluble, low molecular weight urea-formaldehyde condensation product which is heat reactive and stable against formation of turbidity or the production of precipitation for long periods of time. This low molecular weight condensation product is characterized by valuable resistance to discoloration when subjected to elevated curing temperatures of the order of 400° F. and is unique with respect to generally similar urea-formaldehyde condensation products of the prior art whether of high or low molecular weight which do not well resist elevated curing temperature without discoloration. A further feature of the preferred condensation products of the invention is the resistance of these condensation products to liberation of formaldehyde under conditions of elevated curing temperature. This is of considerable advantage since formaldehyde fumes are noxious and undesirable.

The first step in the preparation of the condensation products of the invention is the reaction of formaldehyde with urea. The proportion of formaldehyde to urea in this reaction is of considerable importance. When less than 1.1 mols of formaldehyde are present per mol of urea, the physical and chemical properties of the final cured product are impaired. These properties fall off rapidly below a ratio of 1.1:1.0. Optimum properties are obtained using a ratio of 1.3:1.0. Above a ratio of 1.5:1.0, excessive proportions of hexamethylene tetramine are formed which is undesirable.

The pH of the initial reaction mixture should preferably be in the range of from 6.7 to 7.7. As the pH of the reaction differs substantially from about pH 6.7 to 7.7, the reaction becomes more rapid and less controllable. Strongly acid or strongly basic reaction mediums are to be avoided. Adjustment of pH is effected by addition of alkaline material. Very small quantities of alkaline material are sufficient to achieve the desired pH adjustment and the specific nature of the alkaline material employed is of secondary significance. Although secondary and tertiary amines are preferred alkaline materials, others may be employed such as alkali metal and alkaline earth metal hydroxides, primary amines and even ammonia.

The initial reaction of formaldehyde with urea should be at a temperature of from 20° C. to 55° C. For practical purposes temperatures of from 25° C. to 50° C. are used. At lower temperatures the time of reaction becomes excessive while at higher temperatures the time of reaction must be reduced and it becomes more difficult to detect the proper time for addition of the ammonia or polyfunctional aliphatic amine component.

At a reaction temperature of about 50° C., the initial reaction of formaldehyde with urea up to the point of dimer formation takes about 75 minutes. When the time of reaction is substantially less than about 75 minutes, it becomes difficult to control the reaction and to perceive the proper time for the introduction of the ammonia or polyfunctional amine component. When lower reaction temperatures are used, e.g., temperatures of about 20° C.–25° C., the reaction takes about 7 hours or longer before at least 65% urea consumption is effected.

The initial reaction of formaldehyde with urea must be permitted to proceed until at least about 65% of the urea has been consumed in the reaction to produce monomethylol urea and dimethylol urea. The dimethylol urea is produced in minor proportion with respect to the monomethylol urea. Generally, not more than about 25% of the methylol ureas produced is dimethylol urea. There is no adverse effect occasioned by the presence of these minor proportions of dimethylol urea so long as cyclization or dimerization thereof is substantially prevented. When less than about 65% of the urea is reacted with formaldehyde in the initial reaction, the presence of an excessive proportion of free urea causes the production of insoluble dimers when further formaldehyde is introduced and reacted in the final stage of condensation.

When the initial reaction of formaldehyde with urea is continued for an excessive period of time, there is formed from the monomethylol urea and dimethylol urea which is present in the reaction mixture, dimers of these compounds which are insoluble in the aqueous reaction medium. The presence of these dimers is easily detected by an appearance of turbidity or the formation of a precipitate. When the undesirable dimers are present, they react upon addition of ammonia, polyfunctional amine or further formaldehyde to produce a soluble complex which disappears from view due to dissolution thereof. However, the difficulty has not been removed because these soluble complexes break down upon prolonged standing to destroy the clarity of the solution. Moreover, the product containing the dimer complex, even when used prior to the appearance of turbidity, is substantially less satisfactory than the products of the invention because of inadequate resistance to heat discoloration, inadequate resistance to formaldehyde release and inadequate resistance to thickening at approximately neutral pH.

Under the preferred reaction conditions (temperature of 35° C. and pH of 7.2) 65% consumption of urea initially present is achieved after approximately two hours, at which time the ammonia or polyfunctional amine component may be added. The appearance of turbidity or the formation of a precipitate indicating dimer formation does not take place at the reaction temperature of 35° C. for approximately an additional hour so that the the addition of ammonia or primary amine may be effected at any time after two hours until the end of the third hour. Under other reaction conditions, the addition of ammonia or polyfunctional amine component may be effected at a predetermined time which, by prior test run, has been determined to be close to and in advance of the time of initial formation of turbidity in the clear solution produced when the urea component is dissolved in and reacted with the aqueous formaldehyde solution.

Satisfactory results may be obtained when addition of the ammonia or amine component is effected immediately upon the appearance of turbidity, but it is difficult to do this and there is a risk that dimer formation has proceeded excessively to spoil the product.

The proportion of ammonia or polyfunctional amine which is employed is important. Ammonia is trifunctional, primary monoamines are difunctional. Thus, the proportion of ammonia or amine will vary depending upon the functionality of the material which is selected. As will be understood, the functionality referred to is the number of replaceable hydrogen atoms attached to terminal nitrogen atoms in the selected material. In the present invention there should be a minimum of at least one functional group in the nitrogen-containing component for each urea molecule initially present. In the same manner, there should be a maximum of two functional groups in the nitrogen-containing component for each urea molecule initially present. Accordingly, the proportion of nitrogen-containing material to be employed may be determined by the following equation:

Mols nitrogen-containing material $\times$ replaceable hydrogen atoms attached to terminal nitrogen atoms = at least 1 and not more than 2 $\times$ mols urea Ammonia is the preferred nitrogen-containing material for use in accordance with the invention. Primary aliphatic amines may also be used, suitable amines being methyl amine, ethyl amine, butyl amine and other alkyl monoamines. Mixtures of the various nitrogen-containing materials may also be employed.

It is to be noted that the minimum quantity of nitrogen-containing material is substantial and the small amounts of alkaline material used initially to regulate pH are too small to be significant.

It is important that the addition of substantial proportions of ammonia or polyfunctional amine be delayed until at least about 65% of the urea has been consumed in the reaction. Thus, if a substantial proportion of ammonia, e.g., 0.33 mol of ammonia per mol of urea, is introduced into the initial urea-formaldehyde mixture, then the products which are produced are not sufficiently water-soluble and formaldehyde is released when the condensation product is thermoset by the application of elevated temperature.

The ammonia or polyfunctional amine is thus added after at least 65% of the urea has been consumed through reaction with formaldehyde and prior to the formation of substantial turbidity indicating the presence of detrimental proportions of monomethylol urea dimer or dimethylol urea dimer.

Upon the addition of ammonia or other polyfunctional amine as indicated hereinbefore, an exothermic reaction takes place. The reaction temperature must be permitted to reach at least 60° C. to insure complete reaction with the ammonia or amine component. At reaction temperatures up to about 75° C., the reaction proceeds to completion in about 15 minutes and the reaction mixture may be permitted to stand for several hours longer, e.g., 5 or 6 hours or longer, without detriment. Higher temperatures may be used. However, at temperatures above about 85° C., an excessive reaction time greater than about 15 minutes leads to instability and the formation of an insoluble product which precipitates from the reaction medium. For this reason, it is preferred to have the reaction temperature below about 75° C. to avoid the necessity of stopping the reaction at any particular point. If the exotherm is insufficient to provide the required minimum temperature of 60° C., then extraneous heat may be added. If the exotherm is unduly vigorous, external cooling may be used.

If desired, a small proportion of acid, such as boric acid, in an amount of about 2–4% by weight based on the weight of urea initially present may be employed to facilitate control of the ammonia of polyfunctional amine reaction with the mixture of monomethylol urea and dimethylol urea. The acid component is preferably incorporated in the reaction mixture at the peak of the exothermic reaction.

When the reaction with ammonia or polyfunctional amine has been completed, the reaction mixture is cooled to room temperature to provide a stable intermediate condensation product. This product may be distributed in its intermediate form and is stable in the form of a clear aqueous solution. This intermediate product is intended to be reacted with a further proportion of formaldehyde to produce a valuable, water-soluble, low molecular weight urea-formaldehyde condensation product which is stable, which resists discoloration and loss of formaldehyde upon curing and which is nevertheless highly reactive to permit effective cure at elevated temperature either in the absence of or in the presence of an acidic curing catalyst.

The clear aqueous solution is a mixture of the reaction product of ammonia or polyfunctional amine with monomethylol urea and a minor proportion of dimethylol urea. The solution does not contain any substantial proportion of monomethylol or dimethylol urea dimer complex. However, the reaction product is not sufficiently advanced and the proportion of formaldehyde which is present is inadequate to provide a thermosettable product.

The clear aqueous solution described above is treated by the addition of a further proportion of formaldehyde. At least 0.7 mol of formaldehyde is added to produce a water-soluble, low molecular weight thermosetting resin upon further reaction. Preferably, not more than about 1.2 mols of formaldehyde is added. Up to about 1.5 mols of formaldehyde may be used but formaldehyde release upon curing at elevated temperature becomes excessive. A total of about 3.0 mols of formaldehyde may be used but the total should be kept less than 2.7 to gain the advantage of substantial freedom from formaldehyde release during the curing operation.

The second stage reaction with additional formaldehyde is effected at a temperature of at least about 60° C. At temperatures close to 60° C., the duration of reaction is of minor importance. More elevated temperatures may be used, such as 80° C. or higher up to a refluxing temperature. However, the reaction becomes critical and must be stopped at the more elevated temperatures before excessive resin advance takes place. Thus, and allowing for a gradient of 5° C. per minute in approaching and receding from the maximum temperature from 60° C., the reaction cannot exceed about 30 minutes at 80° C. or about 8 minutes at reflux temperature at atmospheric pressure.

All of the reactions are conducted in the presence of water. However, the proportion of water is not critical. It is desirable to restrict the proportion of water so as to produce aqueous solutions which are as concentrated as possible. It will be understood that the use of formaldehyde solutions which are more concentrated than about 37%, e.g., 44%, introduces certain difficulties, namely, formaldehyde polymerization to produce insoluble paraformaldehyde. As is well known, paraformaldehyde formation in the more concentrated aqueous solutions may be avoided by using solutions having a temperature above about 55° C. and this expedient is desirably used in the last stage of formaldehyde reaction to limit the proportion of water which is introduced and thereby directly obtain solutions having a maximum proportion of resin solids. If desired, the final water solution may be concentrated by distillation removal of water and any methanol which may be present.

It is desired to point out that by proceeding in accordance with the invention, there are produced condensation products of urea with formaldehyde which are water-soluble at both low and high ultimate ratios of formaldehyde to urea. Normally, and particularly at ultimate ratios of formaldehyde to urea of less than about 2:1, water solubility is substantially impaired. It is surprising to find high water solubility achieved at ultimate ratios of formaldehyde to urea as low as 1.8:1 in accordance with the present invention.

The intermediate condensation products as well as the final thermosettable condensation products of the invention are quite different from the urea-formaldehyde condensation products which are known to the art.

The primary condensation products of urea and formaldehyde include monomethylol urea and dimethylol urea. Low molecular weight species of these products are unstable and ordinarily tend to react rapidly with each other or with free urea to form insoluble polymers.

To gain solubility, the urea-formaldehyde condensation reaction has been conducted at more elevated temperatures (70–110° C.) to advance polymerization and introduce additional (secondary) hydrophilic methylol groups into the urea nucleus. In this way, further condensation is prevented until the secondary methylol groups have been split out leading to detrimental liberation of formaldehyde upon curing at elevated temperature.

The relatively high molecular weight of the prior art condensates has also been detrimental since it leads to limited flow, penetration and bonding properties.

Moreover, stability in the prior art with respect to thickening and gelation has generally required that the urea-formaldehyde condensate be stored under alkaline conditions (above pH 8.0). These condensates tended to thicken and gel under neutral conditions but would not cure well unless acidified.

The urea-formaldehyde condensates of the present invention do not thicken or gel under neutral conditions and may be stored at a pH of from 7.0 to 8.0. Surprisingly, and despite stability for many months at room temperature at a pH of from 7.0 to 8.0, the condensates of the invention cure well at a temperature of about 300° F. without the addition of acid catalyst. Specifically, condensates produced by the invention have been stored at room temperature in 40% resin solids water solution at a pH of 7.5 for over a year without appreciable change in viscosity and despite curability at 300° F. for 60 seconds. Further, proportions of acid catalyst, e.g., ammonium bisulfate, are effective to enhance the rapidity of cure without significantly altering the pH of the condensate solution.

Conventional urea-formaldehyde condensates, when applied from water medium as a thin film, dry in air to a non-tacky condition. The condensates of the invention remain resinous (tacky) and adherent for an extended period of time to provide enhanced wetting of surfaces to be bonded. This extended resinous period is attributed to low molecular weight. When tightly twisted yarns are immersed in dilute aqueous solution containing the low molecular weight condensates of the invention, the tightly compacted fibers of yarn are uniquely penetrated by the condensate.

An important commercial advantage is the elimination of formaldehyde fumes during curing at elevated temperatures. Formaldehyde fuming is a substantial nuisance and also represents waste of valuable monomer.

It is believed that the process of the invention provides linear reaction to form products in which reactivity is largely confined to terminal methylol groups as in the formula which follows:

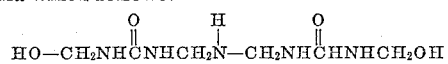

which does not cyclize to impair clarity or storage stability. The same is true when a minimum proportion of ammonia is used (0.33 mol per mol of urea) to produce:

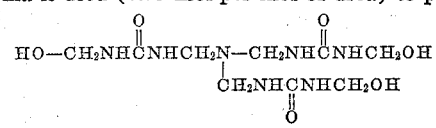

The same is again true using 2.5 mols of formaldehyde per mol of urea to obtain:

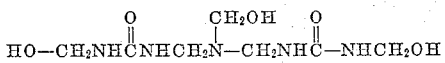

The terminal methylol groups might be expected to be reactive with phenols and phenol alcohols. This has been experimentally confirmed by mixing, on the basis of contained solids, up to 35 parts of the product produced in Example II described hereinafter with 65 parts of dimethylol phenols. The mixture is soluble in water to form a clear solution. When the mixture is cured at 300° F. and then subjected to boiling water for several hours there is no apparent degradation of the copolymer or discoloration in the water. Typical urea-formaldehyde condensates do not form clear aqueous solutions with phenol alcohols. When such mixtures are cured, the films are not clear and tough. The cured material disintegrates when boiled in water, imparting amber color and a fishy odor to the water.

An important aspect of the invention is the elimination of discoloration upon curing at elevated temperatures. It is known to employ aqueous solutions of urea or melamine-formaldehyde for spray application upon glass fiber batts. These sprayed batts are cured to bind the fibers to one another by baking at temperatures up to about 400° F. Urea-formaldehyde condensation products known to the art discolor (take on a brown, burned appearance) upon curing at elevated temperature and discolor badly when baked at 400° F. The condensates of the invention do not discolor, even when cured at 400° F. Instead, they remain white.

The invention is illustrated in the following specific examples:

EXAMPLE I 1.3 mols of formaldehyde in the form of an aqueous solution containing 44% by weight of formaldehyde and less than 2% by weight of methanol were mixed with 1.0 mol of urea in crystalline form. The urea dissolved in the formaldehyde solution to which 0.3 mol of water had been added. Diethanolamine was added to adjust the pH to 7.2 (0.4% by weight based on urea). An exothermic reaction then took place and a water bath was used to maintain the reaction mixture at 35° C. for a period of three hours. 0.5 mol of ammonia in the form of a 28% aqueous solution was then added and an exothermic reaction took place with the temperature rising of its own accord to about 70° C. The reaction mixture was then permitted to stand for 24 hours after which time the mixture was at room temperature (25° C.). A water-clear, limpid solution was obtained containing about 43% solids. Solids were tested by drying a 2 gram sample for 2 hours in an oven heated to 150° C. The solids so obtained were water-soluble (despite drying at 150° C.) and somewhat hygroscopic. These solids, as such or in water solution, were not suited for use as a thermosetting resin. However, the water solution and also the dry resin solids were sellable for use by others after reaction with additional formaldehyde.

EXAMPLE II

To convert the water solution produced in Example I into a thermosetting resin, 1.0 mol of formaldehyde as a water solution containing 44% by weight of formaldehyde and less than 2% methanol, was added to and mixed with the room temperature solution produced in Example I. The formaldehyde solution was at a temperature of 55° C. at the time of addition to prevent formation of paraformaldehyde despite the presence of insufficient water to preclude such formation. An exothermic reaction took place and the temperature rose to 75° C. The mixture was then allowed to cool to room temperature (25° C.) over a 24-hour period. The result was a water-clear solution containing 38–40% resin solids as measured by the procedure described hereinbefore.

This solution had the following properties:

Table I

| | |
|---|---|
| Viscosity cps. @ 25° C. | 10 |
| pH | 7.2–7.8 |
| Specific gravity @ 25/25° C. | 1.170 |
| Water solubility | Infinite |
| Cure time at 300° F., seconds | 40–60 |

The following Table II demonstrates the effect of mixing different amounts of anhydrous ammonium bisulphate with the water solution of Example II. A conventional urea resin obtained on the commercial market for use in treating textiles is also shown for comparison.

Table II

| | Effect of adding ammonium bisulphate upon pH and cure time at 300° F. | | | |
|---|---|---|---|---|
| | Diluted to (percent)— | Grams of resin solids | Grams of catalyst | |
| | | | 0.50 | 0.75 |
| Water solution of Example II | 38 | 100 | | |
| pH | | 7.5 | 7.2 | 6.5 |
| Cure time (seconds) | | 60 | 45 | 38 |
| Commercial resin | 38 | 100 | | |
| pH | | 8.1 | 3.8 | 3.4 |
| Cure time (seconds) | | 100 | 73 | 50 |

As can be seen, with the condensates of the invention, reaction time is speeded significantly with minimum reduction in pH.

In Table III which follows various formulations are presented and these were produced in the manner set forth in Examples I and II except where otherwise set forth in the Table.

Table III

| | Formulations | | | | | |
|---|---|---|---|---|---|---|
| Example | 1 | 2 | 3 | 4 | 5 | 6 |
| First reaction | | | | | | |
| Moles urea | 2.0 | 2.0 | 2.0 | 2.0 | 2.0 | 2.0 |
| Moles 44% HCHO | 2.6 | 2.6 | 2.6 | 2.2 | 3.0 | 2.6 |
| Moles H₂O | .3 | .3 | .3 | .3 | .3 | .3 |
| Diethanolamine weight based on urea, percent | .4 | .4 | .4 | .4 | .4 | .4 |
| Heat to 35° C. and hold, hrs | 3 | 3 | 3 | 3 | 3 | 3 |
| Add 28% NH₃, moles | 0.6 | 1.0 | 1.2 | 1.0 | 1.2 | 1.0 |
| Heat to 70° C. and hold, hrs | 2 | 2 | 2 | 2 | 2 | 2 |
| Cool and allow to stand, days | 1 | 1 | 10 | 1 | 1 | 1 |
| Add HCHO 44%, moles | 1.4 | 1.4 | 1.4 | 1.8 | 1.0 | 1.4 |
| React at 75° C., hrs | 1 | 1 | 2 | 2 | 2 | 2 |
| Cool | End | End | End | End | End | |
| Add 28% NH₃, moles | | | | | | .2 |
| Cool | | | | | | End |

Formulations 1–5 each produced a low molecular weight urea-formaldehyde condensation product which was water-soluble and stable at pH 7.0–8.0, and which was thermosettable at 300° F. Formulations 4 and 5 illustrate approximate limits of initial formaldehyde. Formulations 1 and 3 illustrate approximate minimum and maximum ammonia additions.

Formulation 6 illustrates a feature of the invention which is not limited to low molecular weight. More particularly, ammonia or aliphatic polyfunctional amine as previously defined may be added and further reaction achieved by heating to about 85° C. The greater the proportion of ammonia or polyfunctional amine, the greater is the increase in average molecular weight. However, proportions are important in the sense that less than 0.5 equivalent of ammonia or amine (based on reactive hydrogen) must be used per equivalent of condensation product (based on reactive methylol groups). Otherwise, the reaction product is not adequately thermosetting. However, when more than 0.5 equivalent of ammonia or amine are used, as above set forth, the additional formaldehyde may be reacted with the non-thermosetting product to assure methylol termination and restore thermosetting characteristics. In this way, high molecular weight pre-polymers which are water-soluble may be formed.

The cured or thermoset condensation product is also distinguished by the toughness of the bond which it provides when employed in the bonding of glass fibers in preforms for use in the decorative fiberglass reinforced polyester molding industry. As is conventional, glass fiber batts are laid up about a supporting screen, sprayed with resin and baked to provide a pre-formed shaped fibrous mass which is removed from the screen. Conventional urea and melamine-formaldehyde resins produce a brittle bond which is easily broken. As a result, breakage of preforms is excessive. In the invention, the bond is tough and breakage is substantially reduced.

In the bonding of glass fibers for the production of preforms, the flexibility of the preform may be varied by variation in the proportion of resin solids present in the urea-formaldehyde condensation product containing water solution which is sprayed upon the fiberglass batts. Thus, at higher proportions of resin solids, a stiff and rigid white preform may be obtained. At lower proportions of resin solids in the water solution, the flexibility of the preform is progressively increased.

When spraying fiberglass batts, it is preferred, when automatic preform machines are employed as is conventional, to use a water solution containing 2.5% by weight of resin solids. When spray applications are effected by hand, it is preferred to employ a water solution containing about 5% by weight of resin solids in the water solution. As will be evident, these recommended proportions of resin solids in the water solution may be varied to meet desired preform specifications.

The shelf life of the water solutions containing about 40% resin solids in accordance with the invention has been experimentally established to be at least six months at a storage temperature of 75° F. When the water solutions are stored at lower temperatures, the shelf life increases upon addition of catalyst, e.g., sufficient ammonium bisulphate to reduce the reaction period from about 25 to about 50%. The catalyzed mixtures are stable at room temperature for a period of about 5 days.

Various modifications will be evident to those skilled in the art, the invention being defined in the claims which follow.

I claim:

1. A method of producing a water-soluble, heat-reactive, low molecular weight condensation product of urea and formaldehyde comprising reacting formaldehyde with urea in a mol ratio of from 1.5:1.0 to 1.1:1.0 at a temperature in the range of 20° C.–55° C. in the presence of water and at a pH of from about 6–8 until at least about 65% of the urea has reacted to provide a clear solution which contains monomethylol urea and a minor proportion of dimethylol urea with respect to said monomethylol urea and which is substantially free of monomethylol and dimethylol urea dimers, adding to said clear solution a proportion of a water-soluble nitrogen-containing material providing replaceable hydrogen atoms, selected from the group consisting of ammonia and water-soluble primary alkyl monoamines containing up to 4 carbon atoms in an amount sufficient to provide from 1 to 2 replaceable hydrogen atoms per molecule of urea employed, reacting the mixture of said nitrogen-containing material and said clear solution at a temperature in excess of 60° C. to produce an intermediate condensation product, adding to said intermediate condensation product from 0.7 to 1.5 mols of formaldehyde per mol of urea originally present and reacting the resulting mixture at a temperature in excess of about 60° C. to produce a water-soluble, heat-reactive, low molecular weight condensation product.

2. A method as recited in claim 1 in which the reaction of formaldehyde with urea is conducted at a mole ratio of from 1.5:1.0 to 1.1:1.0 and at a temperature in the range of 20°–55° C. in the presence of water and is conducted at a pH of from 6.7 to 7.7, and said nitrogen containing material is ammonia.

3. A method as recited in claim 2 in which the temperature of the reaction of formaldehyde with urea is maintained at about 35° C. for a period of about 2–3 hours.

4. A method as recited in claim 1 in which formaldehyde is employed as a solution thereof in water containing from about 37% to about 50% by weight of formaldehyde and less than about 2% by weight of methanol.

5. A water-soluble, heat-reactive, low molecular weight condensation product of urea and formaldehyde produced as set forth in claim 1.

6. A clear aqueous solution comprising water having dissolved therein a water-soluble, heat-reactive, low molecular weight condensation product of urea and formaldehyde, said aqueous solution being prepared as set forth in claim 1 and resisting thickening, turbidity and precipitation upon storage for prolonged periods.

7. A method of producing a water-soluble, heat-reactive, low molecular weight condensation product of urea and formaldehyde comprising reacting formaldehyde with urea in a mol ratio of from 1.5:1.0 to 1.1:1.0 at a temperature in the range of 20° C.–55° C. in the presence of water and at a pH of from about 6–8 until at least about 65% of the urea has reacted to provide a clear solution which contains monomethylol urea and a minor proportion of dimethylol urea with respect to said monomethylol urea and which is substantially free of monomethylol and dimethylol urea dimers, adding to said clear solution from 0.33 to 0.66 mol of ammonia per mol of urea employed, reacting the mixture of said nitrogen-containing material and said clear solution at a temperature in excess of 60° C. to produce an intermediate condensation product, adding to said intermediate condensation product from 0.7 to 1.5 mols of formaldehyde per mol of urea originally present and reacting the resulting mixture at a temperature in excess of about 60° C. to produce a water-soluble, heat-reactive, low molecular weight condensation product.

8. A method as recited in claim 7 in which the initial ratio of formaldehyde to urea is 1.3:1.0.

9. A method as recited in claim 7 in which said nitrogen-containing material is added after at least about 85% of said urea has reacted and prior to the formation of substantial turbidity.

10. A method as recited in claim 7 in which said reaction with said ammonia is effected at a temperature of from 60° C. to 75° C.

11. A method as recited in claim 7 in which said reaction with additional formaldehyde is effected at a temperature of from 60° C. to reflux temperature.

12. A method as recited in claim 7 in which from 2–4% of boric acid is added to the clear solution which contains monomethylol urea and to which ammonia has been added after the peak of the exothermic reaction with said ammonia has been reached.

13. A water-soluble, heat-reactive, low molecular weight condensation product of urea and formaldehyde produced as set forth in claim 7.

14. A clear aqueous solution having a pH of from about 7.0 to about 8.0 comprising water having dissolved therein a water-soluble, heat-reactive, low molecular weight condensation product of urea and formaldehyde, said aqueous solution being prepared as set forth in claim 7 and resisting thickening, turbidity and precipitation upon storage for prolonged periods.

15. A method of producing a water-soluble, heat-reactive, low molecular weight condensation product of urea and formaldehyde adapted to provide, in water, clear aqueous solutions which resist thickening, turbidity and precipitation when stored for prolonged periods with said aqueous solutions having a pH of about 7.0–8.0 and which resist discoloration and release of formaldehyde when cured at elevated temperature, comprising reacting formaldehyde with urea in a mol ratio of from 1.5:1.0 to 1.1:1.0 at a temperature in the range of 25° C.–50° C. in the presence of water and at a pH of from about 6.7 to about 7.7 until at least about 65% of the urea has reacted to provide a clear solution which contains monomethylol urea and a minor proportion of dimethylol urea with respect to said monomethylol urea and which is substantially free of monomethylol and dimethylol urea dimers, adding to said clear solution from 0.33 to 0.66 mol of ammonia per mol of urea employed, reacting the mixture of said nitrogen-containing material and said clear solution at a temperature from about 60° C. to about 85° C. to produce an intermediate condensation product, adding to said intermediate condensation product from 0.7 to 1.2 mols of formaldehyde per mol of urea originally present and reacting the resulting mixture at a temperature of from about 60° C. to reflux temperature to produce a water-soluble, heat-reactive, low molecular weight condensation product.

16. A method of producing a water-soluble, intermediate condensation product of urea and formaldehyde adapted to provide a water-soluble, stable, heat-reactive, low molecular weight condensation product upon reaction with additional formaldehyde comprising, reacting formaldehyde with urea in a mol ratio of from 1.5:1.0 to 1.1:1.0 at a temperature in the range of 20° C. to 55° C. in the presence of water and at a pH of about 6–8 until at least about 65% of the urea has reacted to provide a solution which contains monomethylol urea and a minor proportion of dimethylol urea with respect to said monomethylol urea and which is substantially free of monomethylol and dimethylol urea dimers, adding to said solution a proportion of a water-soluble, nitrogen-containing material providing replaceable hydrogen atoms selected from the group consisting of ammonia and water-soluble primary alkyl monoamines containing up to 4 carbon atoms in an amount sufficient to provide from 1 to 2 replaceable hydrogen atoms per molecule of urea initially present and reacting said nitrogen-containing material with said reaction product of formaldehyde with urea at a temperature in excess of about 60° C. to produce an intermediate condensation product.

17. A method of producing a water-soluble, heat-reactive, low molecular weight condensation product of urea and formaldehyde comprising reacting an intermediate condensation product produced as set forth in claim 16 with from 0.7 to 1.5 mols of formaldehyde per mol of urea contained in said intermediate condensation product at a temperature in excess of about 60° C.

18. A method of producing a water-soluble, heat-reactive condensation product of urea and formaldehyde comprising reacting formaldehyde with urea in a mol ratio of from 1.5:1.0 to 1.1:1.0 at a temperature in the range of 20° C.–55° C. in the presence of water and at a pH of from about 6–8 until at least about 65% of the urea has reacted to provide a clear solution which contains monomethylol urea and a minor proportion of dimethylol urea with respect to said monomethylol urea and which is substantially free of monomethyl and dimethylol urea dimers, adding to said clear solution a proportion of a water-soluble, nitrogen-containing material providing replaceable hydrogen atoms, selected from the group consisting of ammonia and water-soluble primary alkyl monoamines containing up to 4 carbon atoms in an amount sufficient to provide from 1 to 2 replaceable hydrogen atoms per molecule of urea employed, reacting the mixture of said nitrogen-containing material and said clear solution at a temperature in excess of 60° C. to produce an intermediate condensation product, adding to said intermediate condensation product from 0.7 to 1.2 mols of formaldehyde per mol of urea originally present, reacting the resulting mixture at a temperature in excess of about 60° C. to produce a water-soluble, heat-reactive, low molecular weight condensation product and reacting with said low molecular weight condensation product up to 0.5 equivalent of said nitrogen-containing material per equivalent of said condensation product by heating to about 85° C.

References Cited in the file of this patent

UNITED STATES PATENTS

| | | |
|---|---|---|
| 2,554,475 | Suen et al. | May 22, 1951 |
| 2,601,598 | Daniel et al. | June 24, 1952 |
| 2,626,251 | James et al. | Jan. 20, 1953 |
| 2,641,584 | Martone | June 9, 1953 |
| 2,657,132 | Daniel et al. | Oct. 27, 1953 |
| 2,769,800 | Suen et al. | Nov. 6, 1956 |
| 2,786,823 | Keim | Mar. 26, 1957 |